Aug. 8, 1967 J. GALLY, JR., ETAL 3,335,285
PHOTOELECTRIC SYSTEM FOR DETECTING OBJECTS IN A ZONE
INCLUDING VIBRATING LIGHT SOURCE
Filed March 24, 1964 2 Sheets-Sheet 1
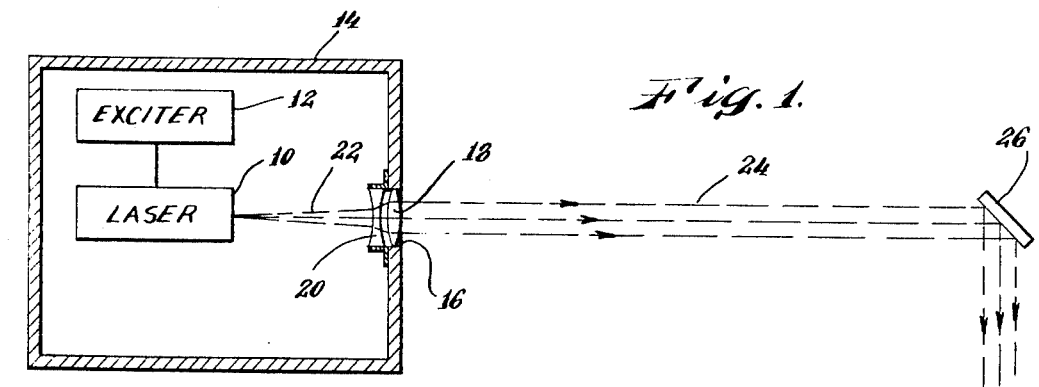
Fig. 1.
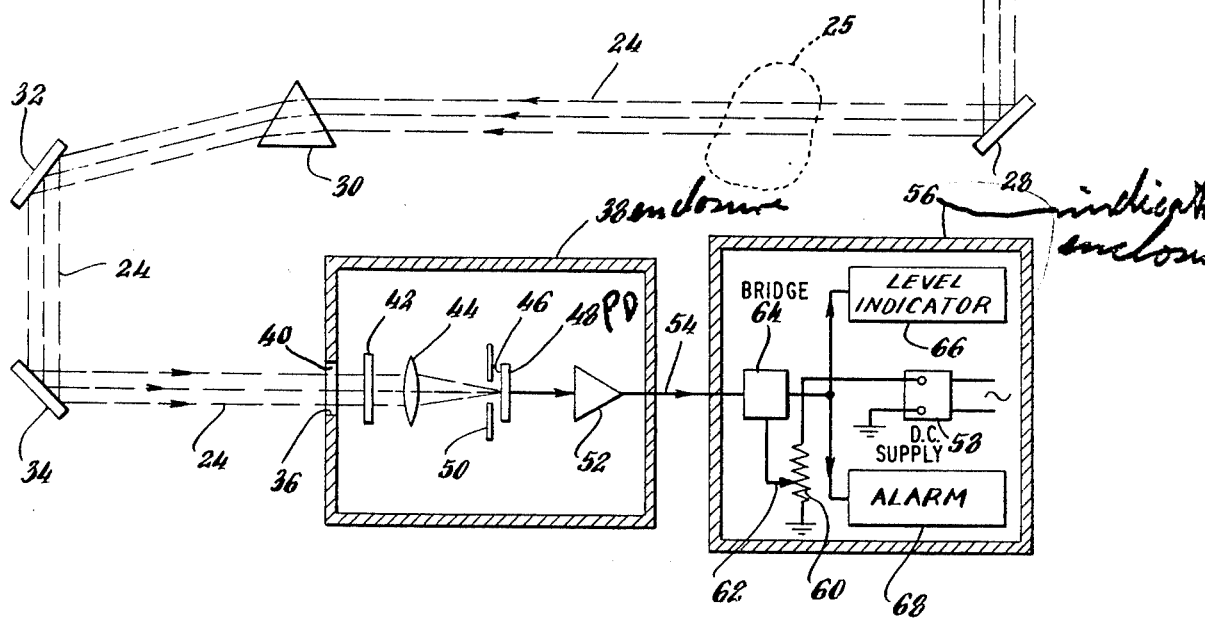
Fig. 2.
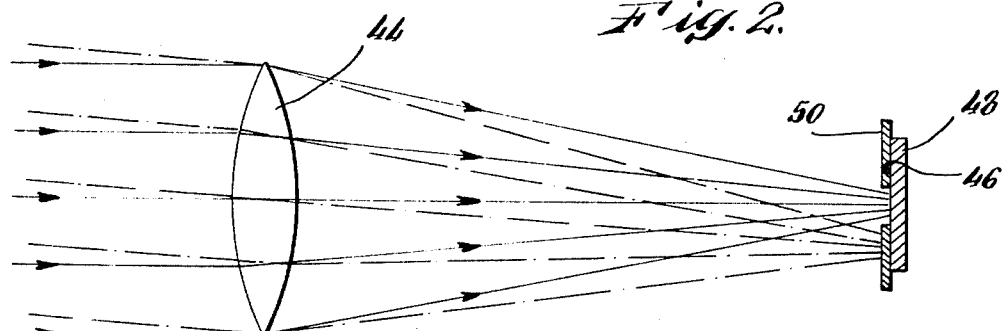
INVENTORS
John Gally, Jr.
BY William J. Kahl, Jr.
Wooster, Davis & Cifelli
ATTORNEYS.

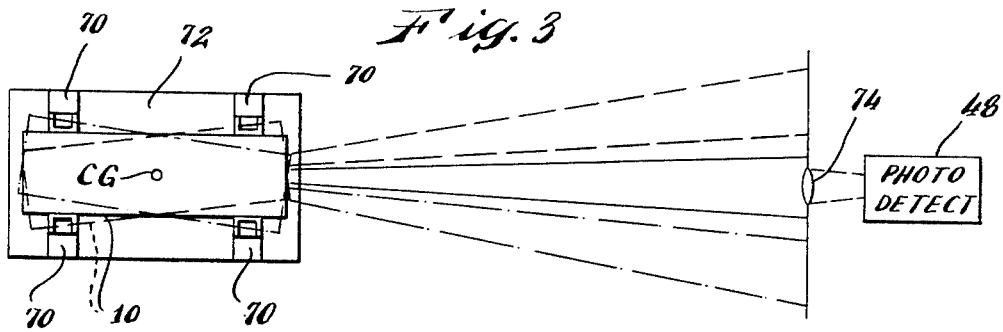
Fig. 3
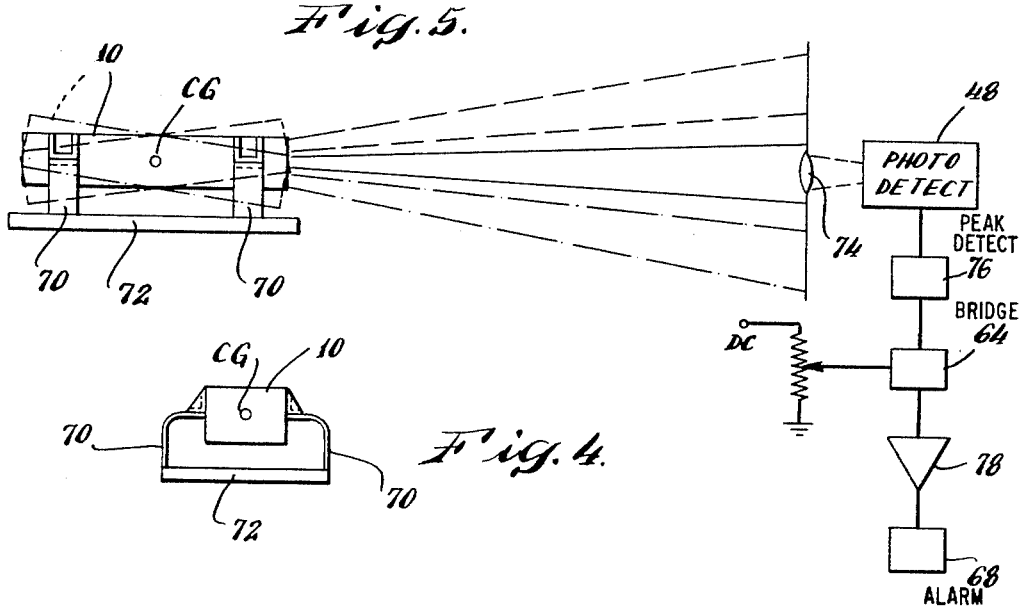
Fig. 5
Fig. 4
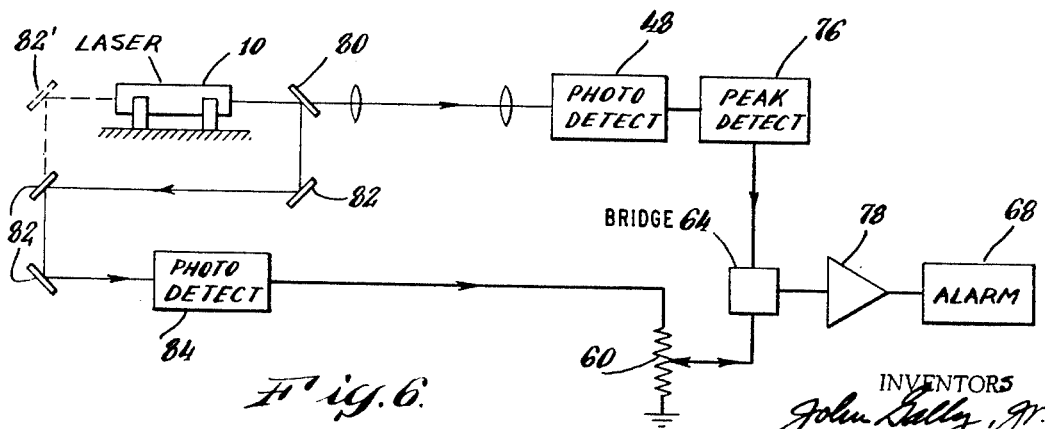
Fig. 6

# United States Patent Office 3,335,285
Patented Aug. 8, 1967

3,335,285
PHOTOELECTRIC SYSTEM FOR DETECTING OBJECTS IN A ZONE INCLUDING VIBRATING LIGHT SOURCE
John Gally, Jr., 20 Cawley Ave., Bethel, Conn. 06801, and William G. Kahl, Jr., 31 Aspen Way, Brookfield, Conn. 06804
Filed Mar. 24, 1964, Ser. No. 354,342
5 Claims. (Cl. 250—221)

This invention relates to a system for detecting the presence of light opaque materials in a preselected zone and, more particularly, to such a system which utilizes a laser as a source of light.

The laser is one of the most recent and exciting developments in the field of physical optics. As is now well-known, the term "laser" is an acronym for "light amplification by stimulated emission of radiation." Lasers have been constructed using both solids and gases as the active medium. Regardless of the type of medium employed, laser energy is characterized by certain novel features including the qualities of coherence and single wavelength. In addition, many lasers emit plane polarized radiation. A number of advantages accrue from these characteristics which are unique to laser-generated radiation. The fact that a laser generates radiant energy at a single wavelength, for example, means that the laser beam may be highly collimated using simple lenses. There is no chromatic aberration problem. The laser beam may be easily focused to a small area. Highly selective spectral filtering of the laser beam may be accomplished. The laser beam can be bent through a prism without differential refraction. The coherence of the laser beam means that an extremely high energy concentration at the laser wavelength is achieved. This makes it possible to utilize the laser beam over extremely long distances. Finally, the fact that the laser beam is plane polarized means that a polarizing filter may be utilized to achieved ambient light rejection.

Light detection systems have been previously employed in various applications. For example, they have been employed as burglar alarm systems. However, they have not been completely successful in such service for a number of reasons. One reason is that a system employing a standard light source may be easily jammed—either intentionally, as by use of a flashlight, or unintentionally by high ambient light levels. The latter consideration has resulted in such systems often being inoperative during daylight hours. Another disadvantage of such systems is that light is easily attenuated by smoke and dust particles.

In spite of the many advantages that a laser light source would have in a light detection system, it has not been obvious, until the present invention, to utilize a laser for such service. This because of the presence of certain disadvantages in a laser source which render it particularly difficult to employ. For example, the energy output of a laser may not be consistently level but is apt to vary, resulting in a false alarm. Another difficulty arises from the fact that a laser source is not a point source but, rather, resembles a finite number of point sources. For this reason, the laser beam cannot be tightly collimated with a single convex lens. Still another difficulty arises from what would normally be considered an advantage—i.e., the ability to focus a laser beam to a very small area. This would present a particularly serious problem in an installation using a long path length because vibration of the laser and any reflectors, prisms, or other optical elements would cause the laser beam to "dance" on and off the detector aperture. Scintillation of the laser beam will give a similar result as would thermal gradients and convection currents, particularly in long range installations.

Accordingly, it is the primary object of this invention to provide an optical detection system utilizing a laser as the light source. Other objects are to provide such a system which is substantially impervious to jamming, either by ambient light or by artificial illumination; to provide such a system which is highly sensitive; to provide such a system which is usable at along ranges; and to provide such a system which is not affected by variation in the intensity of the laser energy. Other objects, features, and advantages will be apparent from the following description, the appended claims and the figures of the attached drawing, wherein:

FIGURE 1 is a schematic illustration of a laser detection system in accordance with the present invention;
FIG. 2 is an illustration showing the manner in which spatial filtering at the photodetector is achieved;
FIG. 3 is a top view of a laser and detector illustrating one modification in accordance with the invention;
FIG. 4 is an end view of the laser of FIG. 3;
FIG. 5 is a front view of the laser of FIG. 3; and
FIG. 6 is a schematic illustration of a long-range, high-sensitivity laser detection system in accordance with the invention.

In FIG. 1 there is illustrated a laser 10 and its exciter 12 mounted within a transmitter enclosure 14. The laser power supply is not illustrated as such supplies are well-known to those skilled in the art and a full disclosure of this invention may be had without its description. The wall of transmitter enclosure 14 includes a window 16 in which is positioned a convex collimating lens 18. Between convex lens 18 and the laser 10 is positioned a concave lens 20. The combination of lenses 20 and 18 serves to collimate the diverging beam 22 from laser 10 into collimated beam 24. The collimated beam 24 is directed through the area to be protected by suitable optical elements, such as reflectors and prisms. A beam-interrupting medium is shown at 25. In the illustration of FIG. 1, the beam is shown as being directed by reflectors 26, 28 to a prism 30. Prism 30 refracts the beam slightly directing it via reflectors 32 and 34 to the window 36 of a receiver enclosure 38. The beam passes through an interference filter 40 which is mounted in window 36 and then through a polarizing filter 42 to a convex lens 44. Lens 44 focuses the laser beam onto the sensitized surface 46 of a photodetector 48. The sensitized surface 46 is masked by spatial filter 50 to cover essentially all the sensitized surface with the exception of that portion contacted by the minimum circle of confusion of the focused beam. The electrical output from photodetector 48 is amplified by amplifier 52 and conducted by a suitable conductor 54 to an indicator enclosure 56 which may be located either adjacent the receiver enclosure 38 or at a remote location. Within the enclosure 56, there is included a D-C power supply 58 which supplies a balancing potentiometer 60. The output of the balancing potentiometer from the sliding contact 62 is balanced against the output from amplifier 52 by means of a suitable balancing bridge 64. The output from balancing bridge 64 is connected to a signal level indicator 66 and to an alarm 68.

The illustration of FIG. 1 discloses a number of components and techniques which combine with the peculiar characteristics of the laser source to provide a highly useful system for detecting the presence of any interrupting or absorbing medium in the beam path. These features may be best understood by considering the operation of the system with particular reference to FIG. 1.

As has been pointed out above, a laser source can be likened to a finite number of point sources within the laser aperture, each point source radiating in a discrete direction within the laser beam. In other words, it is composed of a finite number of small divergent beams within the larger divergent overall laser beam. For this reason, it cannot be tightly collimated with a single convex lens. For this reason, the laser beam is first passed through the concave diverging lens 20 before passing through the convex collimating lens 18. The concave lens serves to increase the collimating lens aperture in the near field allowing the beam 24 to be tightly collimated. Because the laser beam is monochromatic, many of the difficulties associated with ordinary white light such as chromatic aberration and differential refraction are avoided. Accordingly, it is not necessary to employ high quality optics for the reflectors 26, 28, 32, 34 or for the prism 30. This factor is of particular important because the overall length of the beam may be quite long as a result of its high energy concentration. For this reason, the use of inexpensive optics allows the beam to be bent or folded many times at a relatively low cost, thus permitting large area coverage with a single unit.

In order to make the unit jam proof, three filters are employed in the receiver enclosure 38. The interference filter 40 is of a type well-known in the optical art and has an extremely narrow pass band. Interference type filters are commercially available having pass bands as narrow as one Angstrom unit. For this reason, substantially all wavelengths, with the exception of the wavelength of the particular laser beam, may be rejected at the entrance to the receiver enclosure. A further feature of the interference filter 40 is that the acceptance angle of an interference filter becomes narrower as the pass band decreases. For this reason, any illumination striking the filter from an angle outside the acceptance angle will also be rejected, even though the wavelength is actually the same as that of the laser beam. The fact that laser illumination is plane polarized, allows even further filtering by means of the polarizing filter 42. No light will pass through this filter which is not polarized in the same plane as that of the laser beam. The spatial filter 50 permits still further filtering, as is most clearly illustrated in FIG. 2. The monochromatic nature of the laser energy entering the pupil of convex lens 44 permits imaging of the collimated beam to an extremely small minimum circle of confusion on the sensitive surface 46 of photocell 48. By masking the remaining surface by means of the opaque spatial filter 50, any ambient illumination which originates outside the collimated laser beam (illustrated by the dash-dotted lines of FIG. 2) will be imaged on the filter and, accordingly, will not be detected.

It will be obvious from the foregoing that the laser detection system of this invention will have a high degree of reliability and will be substantially unaffected by any radiation except that produced by the laser itself. Accordingly, it is virtually impossible for this system to be rendered inoperative either by intentional use of another light source or by ambient illumination. Accordingly, this system is not limited to night time use but is equally operable in full daylight.

The balancing bridge 64 in the indicator enclosure 56 may be of any type known to the prior art. Its primary function is to detect changes in intensity of the laser beam by balancing the amplified output of the photodetector against a reference voltage. By means of this arrangement, the system may be made highly sensitive to partial interruption of the laser beam such as might occur, for example, from the presence of smoke, dust, or vapors in the beam path.

It is, of course, not necessary that all the elements illustrated in FIG. 1 be present in any single laser system. For example, it may be unnecessary, in certain installations, to utilize any or all of the three filters which are illustrated in the receiver enclosure. The balancing circuit may also be unnecessary, particularly if the system is to be used for the detection of solid objects. Other modifications and variations will also suggest themselves to those skilled in the art.

As has been pointed out above, one advantage of the present laser detection system is its ability to be used over extremely long distances. This is a direct result of the extremely high energy concentration of the laser beam, and the high degree of collimation which may be achieved. Applications where this particular feature may be of importance would include smoke and dust detection in such areas as mine shafts and subway tunnels. However, in such applications certain difficulties may arise due to aiming problems. A laser beam having an angular spread of 0.1 milliradian will increase in size from what is substantially a point source to a one foot diameter cross section at a distance of 10,000 feet. The laser must be aimed to within approximately plus or minus one half its beam width to cover the detector aperture. A 0.1 milliradian laser having its mounting feet spaced 10 inches apart parallel to the beam axis must be capable of having its feet adjusted perpendicular to the beam axis to within plus or minus .0005 inch. This may be easily done with conventional mechanisms, such as a differential screw. However, the primary difficulties arise after this initial aiming. All locations are subject to a certain amount of vibration due to either natural or mechanical phenomena. For example, sixty cycle vibration is commonly caused by electrical equipment. With an extremely long radius arm—for example, the 10,000 feet referred to—vibration of the laser will cause the received beam to "dance" on and off the detector aperture. Similar results will occur from vibration of optical components in the beam path. The present invention solves this difficulty by a highly unique approach. Instead of mounting the laser and the optical elements firmly in an effort to prevent their vibration, they are mounted on undamped vibration isolators. FIGS. 3, 4 and 5 illustrate a laser mounting of this type wherein the laser 10 is mounted on springs 70 to a base 72. These springs are connected to the laser in a plane passing through its center of gravity CG, so as to leave the laser free to vibrate about such center of gravity. The springs are sufficiently stiff so that the amplitude of the vibration will be limited. Sixty cycles per second, for example, may be selected as a resonant frequency for mounting the laser. Sufficient ambient disturbances are almost always present (for example, transformer lamination hum) to induce resonance. The vibrating motion of the laser, which is exaggerated in FIGS. 3 and 5 for purposes of illustration, causes the laser beam to oscillate back and forth across the receiving aperture 74 of the photodetector 48. Each time the laser beam crosses the aperture, it will be detected and a voltage of trapezoidal wave shape produced. This voltage is detected by a peak detector 76, which is designed with a time constant many times greater than the mean time between occurrences of the trapezoidal impulses. Accordingly, the output from the peak detector 76 provides an accurate measurement of received laser energy regardless of vibration and similar misalignments. The output of the peak detector 76 passes to a bridge 64, an amplifier 78 and an alarm 68 which operate in essentially the same fashion as the circuitry previously described with reference to FIG. 1. The use of a peak detector having the characteristics just described is also of value in solving the problems which result from thermal gradients and convection currents, which cause bending of a long range laser beam, and problems arising from scintillation or "winking" of the beam.

In a highly sensitive detection system, it may be advisable to make some provision for monitoring changes of intensity in the laser output. FIG. 6 illustrates a suitable arrangement. In this configuration, the main beam passes to a photodetector 48, a peak detector 76, and through a comparison bridge 64 to an amplifier 78 and alarm 68. However, in this arrangement a beam splitter 80 redirects a portion of the laser beam via reflectors 82 to a second photodetector 84. The output of this photodetector supplies the balancing potentiometer 60. It will be seen that this system continuously monitors the strength of the laser beam so that any change in intensity occurring at the laser itself as an equal effect on both sides of the balancing bridge 64 and is thereby cancelled. An alternative to using a beam splitter, particularly suitable for a gas laser, would be to employ a reflector 82' to monitor radiation leaving the rear end of the laser tube. It would also be possible to employ a single detector and to focus both beams thereon by means of a suitable time-sharing arrangement, such as a chopper.

Although the term "light" is used herein to conveniently describe and claim the present invention, the term is not to be restricted in its meaning to radiation providing a visual response. Rather, the term is to be broadly construed as electromagnetic radiation having frequencies both above and below the visual frequency range. For example, the invention may be particularly useful in some applications when employing infrared or ultraviolet radiation.

It will be apparent from the foregoing description that the present invention is uniquely suited to a large number of detection applications. It will also be apparent that a large number of variations and modifications may be made in this invention without departing from its spirit and scope. Accordingly, the foregoing description is to be construed as illustrative only, rather than limiting. The invention is limited only by the scope of the following claims.

What we claim as new and desire to secure by Letters Patent of the United States is:

1. A system for detecting the presence of light opaque materials in a preselected zone which comprises: light sensitive means for producing a first electrical signal responsive to the intensity of light received thereon; a laser light source mounted to vibrate in response to local vibration; means for directing the light from said laser light source in a path through said preselected zone to oscillate across said light sensitive means; and alarm means connected to receive said first electrical signal and indicate attenuation of said light resulting from the presence in said path of said light opaque materials.

2. The system of claim 1 wherein said alarm means includes integrating means for converting said first electrical signal to a substantially steady signal.

3. The system of claim 2 wherein said integrating means comprises peak detector means having a time constant longer than the oscillation period of said light.

4. A system for detecting the presence of light opaque materials in a preselected zone which comprises: a light source mounted to vibrate in response to local vibrations to cause a light beam therefrom to oscillate; means for directing the light beam from said source in a path through said preselected zone; light sensitive means positioned to periodically receive the oscillating beam to produce a first intermittent electrical signal therefrom; peak detector means having a time constant longer than the oscillation period of said beam connected to receive said first electrical signal and produce a substantially steady second electrical signal therefrom; and indicating means connected to receive said second electrical signal and indicate attenuation of said beam resulting from the presence in said path of said light opaque materials.

5. The system of claim 4 wherein said indicating means comprises: a voltage source for producing a third electrical reference signal; comparing means responsive to both of said second and third electrical signals to produce a fourth electrical signal proportional to differences therebetween; and alarm means actuated by said fourth electrical signal.

References Cited
UNITED STATES PATENTS

| | | | |
|---|---|---|---|
| 2,699,701 | 1/1955 | Strother et al. | 250—219 |
| 2,900,521 | 8/1959 | Eames | 250—221 X |
| 3,096,767 | 7/1963 | Gresser et al. | 331—94.5 |
| 3,187,183 | 6/1965 | Mindheim et al. | 250—219 |
| 3,191,048 | 6/1965 | Cowen | 250—221 |
| 3,202,828 | 8/1965 | Chen | 250—225 |
| 3,235,738 | 2/1966 | Kress et al. | 250—221 |

RALPH G. NILSON, *Primary Examiner.*

M. A. LEAVITT, *Assistant Examiner.*